United States Patent [19]

Anquetin

[11] Patent Number: 5,312,215
[45] Date of Patent: May 17, 1994

[54] UNIVERSAL PLUG

[75] Inventor: Robert P. Anquetin, Etrechy, France

[73] Assignee: Black & Decker Inc., Newark, Del.

[21] Appl. No.: 106,329

[22] Filed: Aug. 13, 1993

Related U.S. Application Data

[63] Continuation of Ser. No. 26,703, Mar. 5, 1993, abandoned.

[30] Foreign Application Priority Data

Mar. 10, 1992 [GB] United Kingdom ............. 9205192.9

[51] Int. Cl.$^5$ ............................................. F16B 13/04
[52] U.S. Cl. .......................................... 411/38; 411/59
[58] Field of Search ................ 411/38, 36, 34, 37, 411/29, 57, 30, 71, 55, 59, 18, 33

[56] References Cited

U.S. PATENT DOCUMENTS

| 3,174,387 | 3/1965 | Fischer | 411/37 |
| 3,365,999 | 1/1968 | Perlin | 411/34 |
| 3,779,239 | 12/1973 | Fischer et al. | 411/38 X |
| 4,269,106 | 5/1981 | Leibhard et al. | |
| 4,556,351 | 12/1985 | Wollar et al. | 411/38 |
| 4,642,009 | 2/1987 | Fischer | 411/38 |
| 5,205,688 | 4/1993 | Sundstrom | 411/38 |

FOREIGN PATENT DOCUMENTS

| 0169335 | 1/1986 | European Pat. Off. | |
| 0388694 | 9/1990 | European Pat. Off. | |
| 2947751 | 8/1981 | Fed. Rep. of Germany | 411/34 |
| 3907593 | 9/1990 | Fed. Rep. of Germany | 411/55 |
| 0204159 | 12/1986 | PCT Int'l Appl. | |
| 90/08265 | 7/1990 | PCT Int'l Appl. | |
| 973512 | 10/1964 | United Kingdom | |
| 1541590 | 3/1979 | United Kingdom | |
| 2015676 | 12/1979 | United Kingdom | |

Primary Examiner—Rodney M. Lindsey
Attorney, Agent, or Firm—Charles E. Yocum; Dennis A. Dearing; John D. Del Ponti

[57] ABSTRACT

A plug is suitable for use in preformed blind holes in rigid and soft material and also holes in sheet form material. The plug comprises a head portion joined to a tail portion by four identical legs, all having flexing points towards their ends and in a central portion, the radial thickness of the legs increasing towards the central portion, so that the outer diameter of that portion is greater than the diameter of the tail portion and the head portion, and the transverse thickness of the legs decreasing towards the central portion.

6 Claims, 3 Drawing Sheets

UNIVERSAL PLUG

This application is a continuation of application Ser. No. 026,703 filed Mar. 5, 1993 now abandoned.

BACKGROUND OF THE INVENTION

This invention is concerned with plugs for use in securing a screw in a previously formed hole in a work piece.

Plastic plugs, which are inserted into a hole in a work piece, to receive a conventional screw to secure the screw to the work piece are well known.

It is usual to use different plastic plugs for different work pieces, in particular for securing screws into a blind hole in a hard work piece, such as brick or concrete, into a blind hole in a soft friable work piece, such as blown concrete, or into a hole extending right through work piece.

Attempts have been made to provide a plug which is suitable for use in all these three situations, but the requirements for a fastener to work satisfactorily in all three conflict with one another.

For a plug which is to secure a screw in a hole in rigid work piece, the plug is conventionally of uniform outside diameter so that it may readily be inserted in the hole. A central bore, to receive the screw is usually provided with ridges so that on the screw being driven into the plug the screw engages the plug firmly, and a small amount of expansion of the plug takes place to grip the hole firmly. Use of such a plug in a friable material will usually not provide a firm fixture as the expansion of the plug is inadequate to hold the plug securely in the material.

For a plug which is to secure a screw in a hole through a sheet form material, the plug usually comprises a tail portion connected to a head portion of the plug by a series of legs, and the screw is intended to pass freely through the bore of the plug until it reaches the tail portion, and then to draw the tail portion towards the head portion to force the legs to bend outwardly to secure the plug to the work piece. It will be realized that the provision of ridges in the bore of the plug (to enable the plug to be used, as above, in rigid material) will prevent easy passage of the screw from the head portion to the tail portion.

A plug which is intended to be used in the two above situations is described in WO/9008265.

This plug comprises a head portion having an enlarged flange adapted to engage the work piece and a generally cylindrical portion, tapering outwards slightly from the flange, a cylindrical tail portion of substantially the same diameter as the smallest part of the head portion and four legs interconnecting the tail portion and the head portion.

These legs are in two pairs, one pair of opposed legs of approximately a semicircular cross section, and another pair of opposed legs of somewhat smaller cross section.

This plug will operate successfully in a hole in rigid material, and will also operate in a hole in sheet form material of appropriate thickness.

However in soft friable material, the plug will not generally operate satisfactorily: the plug will not expand adequately into the friable material simply on insertion of a screw into the plug, and if the screw is driven further, the rigidity of the larger pair of the legs is such that only a small amount of lateral expansion, in a manner comparable to that taking place when used with sheet material, will take place, and a secure fastening cannot be ensured.

It is one of the objects of the present invention to provide a plug for use in securing a screw in a previously formed hole in a work piece which is useful in a wide variety of circumstances.

SUMMARY OF THE INVENTION

This present invention provides a plug for use in securing a screw in a previously formed hole in a workpiece comprising a head portion having an enlarged flange adapted to engage the workpiece and a cylindrical portion a cylindrical tail portion of substantially the same external diameter as the cylindrical portion of the head portion four legs interconnecting the tail portion and the head portion a substantially uniform bore extending through the head portion and the four legs to the tail portion the tail portion being provided with screw engaging projections having a central bore of lesser diameter than the substantially uniform bore the four legs being identical with each other in shape and each comprising a first flexing portion of reduced thickness adjacent the cylindrical tail portion a second flexing portion of reduced thickness adjacent the cylindrical tail portion a third flexing portion of reduced thickness approximately mid way between the first and the second flexing portions the thickness of the leg increasing radially of the plug and decreasing transversely of the radial direction between the first flexing portion and the third flexing portion and between the second flexing portion and the third flexing portion, the overall outer diameter of a central portion of the four legs being slightly greater than the outer diameter of the cylindrical portion of the head portion.

BRIEF DESCRIPTION OF THE DRAWING

There now follows a description, to be read with reference to the accompanying drawings, of a plug embodying the invention In the accompanying drawings

DESCRIPTION OF THE INVENTION

Figure 1:
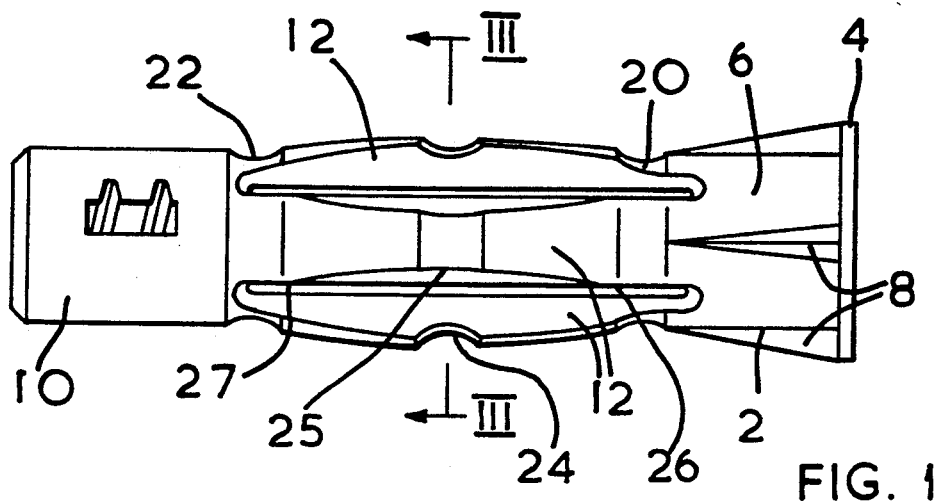
FIG. 1 shows a side view of a plug embodying the invention.
Figure 10:
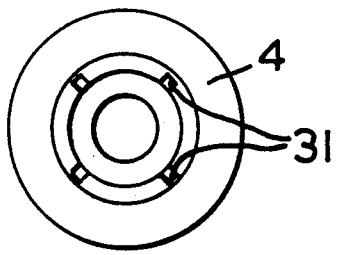
FIG. 10 shows an end view of a head portion of the plug.
Figure 3:
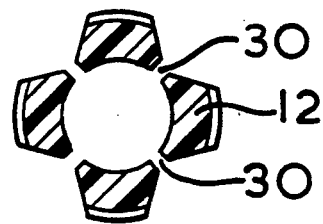
FIG. 3 shows a view in section along the line III—III of FIG. 1.

A plug embodying the invention is shown in FIG. 1. This plug is made of nylon, preferably Nylon 6—6. As will be explained later, the plug is usable in three different modes to secure screws in a previously formed hole in a work piece.

The plug comprises a head portion 2 which has an enlarged flange 4 adapted to engage the surface of the workpiece in the use of the plug. The head portion 2 comprises a cylindrical portion 6 of uniform outside diameter. Four ribs 8 extend from the portion 6 to the flange 4 to assist in preventing rotation of the plug when inserted into a workpiece.

The plug also comprises a cylindrical tail portion 10 of substantially the same external diameter as the head portion. Four identical legs 12 inter connect the tail portion 10 and the head portion 2.

A substantially uniform smooth bore 14 extends through the head portion 2 and the four legs 12 to the tail portion 10. The tail portion 10 is provided with screw engaging projections in the form of thread shaped lands 16 which have a central bore of lesser diameter than the bore 14, but the diameter of the bottom of generally helical recesses 18 between the lands 16 is approximately the same as that of the bore 14.

Figure 2:
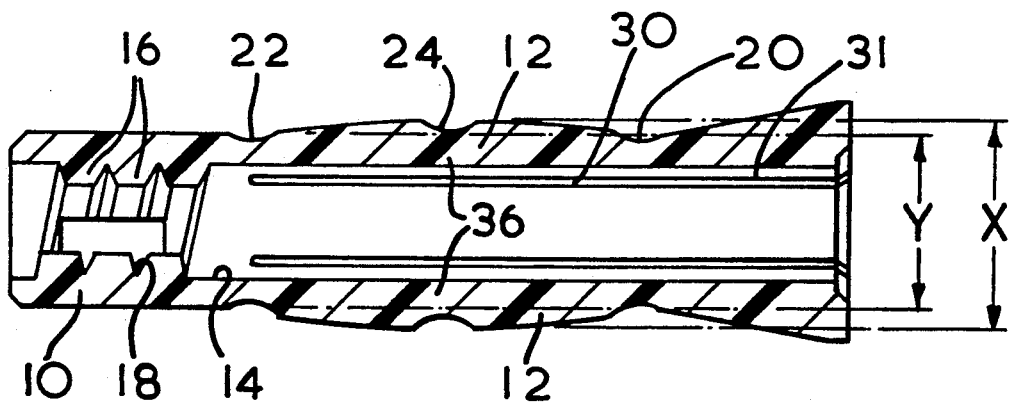
FIG. 2 shows a view of the plug in longitudinal section.

Each leg comprises a first flexing portion 20 of reduced thickness adjacent the cylindrical portion 6 of the head portion a second flexing portion 22 of reduced thickness adjacent the tail portion 10, and a third flexing portion 24 of reduced thickness approximately midway between the flexing portions 20 and 22. The thickness of the leg (see FIG. 2) radially of the plug increases from the first flexing portion 20 towards the third flexing portion 24, and from the second flexing portion 22 towards the third flexing portion 24. It can thus be seen that the overall outer diameter X of a central portion of the four legs is slightly greater than the outer diameter Y of the cylindrical portion 6 of the head portion 2.

Each leg 12, viewed in a direction radial of the plug generally perpendicular to the leg (as in FIG. 1) comprises bowed side faces 25, 25. Extending from the bowed side faces 25, 25 to the head portion 2 are parallel side faces 26, 26, and from the bowed side faces 25 to the tail portion 10 are parallel side faces 27, 27. The side faces 25, 27 of one leg are perpendicular to the side faces of adjacent legs. Thus the thickness of the leg transversely of the radial direction decreases between the first flexing portion 20 and the third flexing portion 24, and between the second flexing portion 22 and the third flexing portion 24. A small gap 30, of generally uniform width, extends between inner edges 32 of adjacent side faces of two legs 12. This gap 30 extends from the second flexing portion 22 past the first flexing portion 24 and a short way into the cylindrical portion 6 of the head portion 2. The head portion 2 is provided with four equally spaced internal axial grooves 31 which are continuations of the gaps 30.

The plug may be utilized in three different modes.

Figure 4:
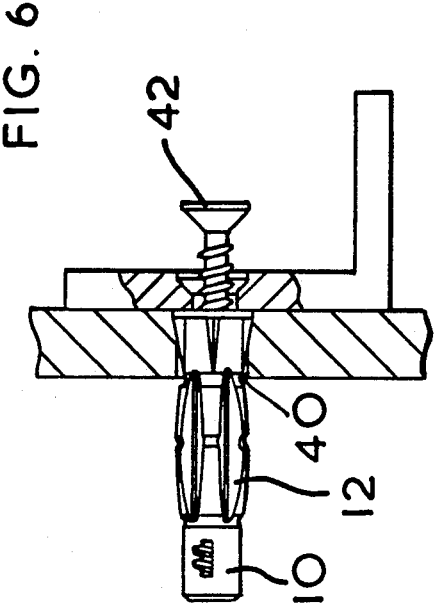
FIGS. 4 & 5 show a first mode of use of the plug.
Figure 5:
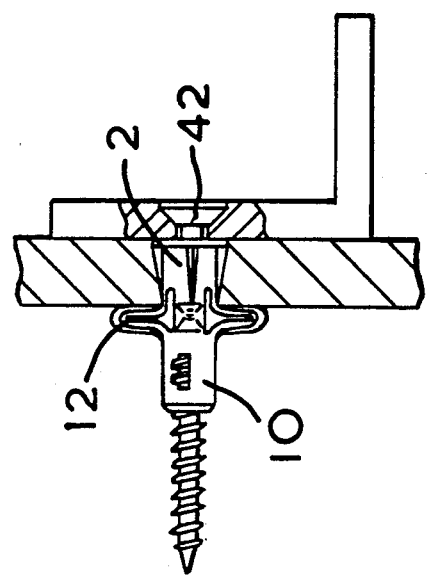

In a first mode (FIGS. 4 and 5) the plug is used in a blind hole in fairly strong material, e.g. brick. A hole 34 is prepared which is approximately of the size of the cylindrical head portion 6 of the plug. The plug is then inserted in the hole. It will enter the hole easily, central portions of the four legs being pushed inwardly closing the gaps 30 with slight flexing at the three flexing portions of each leg and inward portions 36 of each leg moving into the central bore 14 to provide a portion of reduced diameter in the bore, this diameter decreasing from the head portion 2 to the middle of the legs 12, and then increasing again from the middle portion to the tail portion 10. A screw 38 is then inserted. The screw is of appropriate diameter to engage the legs 12 where they have been forced inwardly. Depending on the nature of the material of the workpiece, the legs 12 may be forced outwardly by the screw, enlarging the hole 34, but in most materials the legs will serve to grip the screw 38 tightly and also the inner surface of the hole 34.

When the point of the screw 38 reaches the tail portion 10 of the plug it engages the lands 16. If the plug is a close fit in the hole 34, the screw will be forced through the tail portion 10, thus serving to increase the grip of the plug both on the screw 38 and the hole 34. Should the hole be somewhat oversize for the plug, the screw will pull the tail portion 10 towards the head portion 2, thus to expand the legs 12 somewhat to improve the grip within the hole.

In a second mode of utilization of the plug, the plug is used in a hole which extends through material of a thickness less than the plug.

Figure 6:
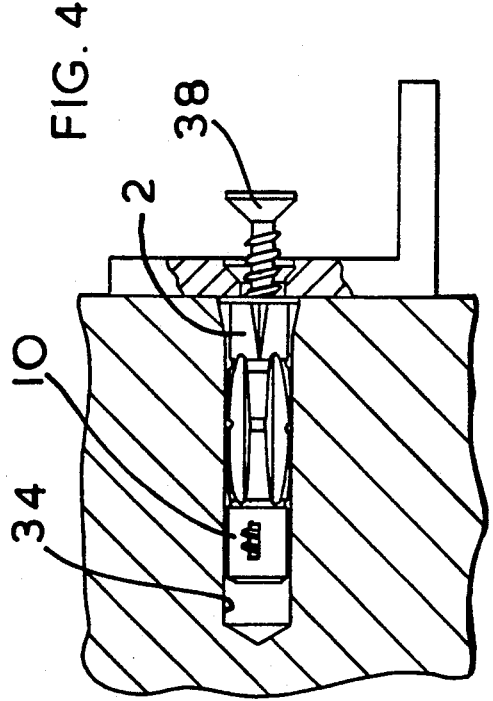
FIGS. 6 & 7 show a second mode of use of the plug.

As shown in FIG. 6, the material is of a thickness approximately equal to the length of the head portion 2. A hole 40 is prepared which is approximately the size of the cylindrical head portion of the plug. The legs 12 will flex inwardly as the plug is pushed through the hole 40 and will then reassert themselves on the other side of the work piece.

Figure 7:
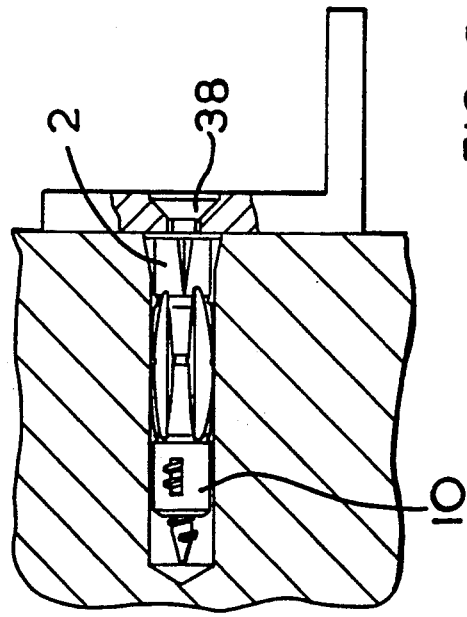

A screw 42 is then inserted. It is able to pass along the uniform bore 14 with very little effort, engagement between the screw 42 and the bore being minimal. When the point of the screw 42 reaches the tail portion 10 of the plug it engages the lands 16, and further turns of the screw, when the head 44 of the screw is not capable of further movement towards the workpiece, will cause the tail portion 10 to be drawn towards the head portion 2 and the legs 12 bow outwards, flexing at the three flexing portions. The final position of the plug is as shown in FIG. 7, with the legs 12 flexed into a tight U shape and abutting against the inner face of the workpiece.

Figure 8:
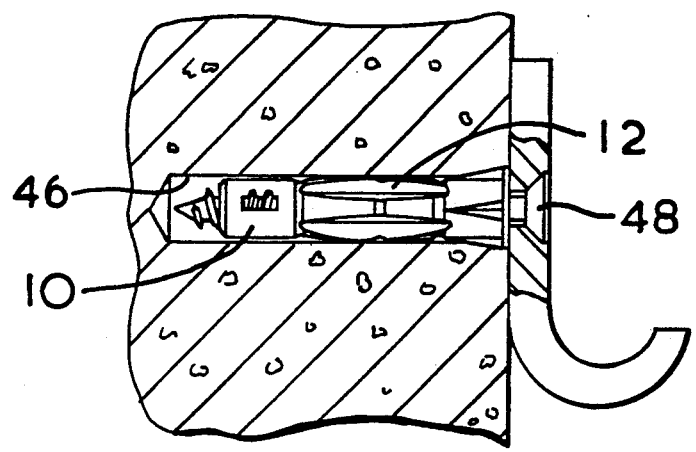
FIGS. 8 & 9 show a third mode of use of the plug.

In the third mode (FIGS. 8 & 9) the plug is used to secure a screw in a blind hole in a workpiece of soft or friable material.

Figure 9:
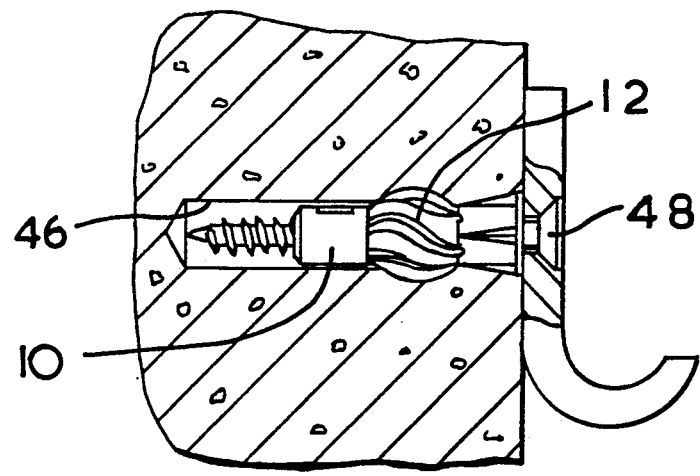

A hole 46 of approximately the size of the cylindrical head portion 6 is prepared and the plug is inserted in the hole. A screw 48 is then inserted. While the legs 12 will have been, to some extent, pushed inwardly by insertion into the hole 46, the nature of the material is such that the screw can readily be pushed through the plug (pushing the legs 12 outwardly into the soft material), until the screw engages the lands 16 of the tail portion 10. Generally further screwing of the screw 48 will cause the screw to enter into the tail portion 10 and also some rotation of the tail portion 10, thus bending the legs 12 into somewhat of an S shape. Further rotation of the screw 46 will cause the tail portion 10 to be drawn towards the head portion 2 with an outwards bowing of the legs 12, thus to assume a bulging configuration as shown in FIG. 9. It will be understood that the actual configuration of the plug when the screw 48 is firmly secured will be to some extent dependent on the nature of the material of the workpiece and on the precise diameter of the hole 46.

The construction of the legs 12 contribute towards the ability of the plug to assume the shape shown in FIG. 9. Firstly the four legs 12 are all of the same construction, so they all tend to deform in the same way. Secondly, while each leg is increasing in radial thickness from its outer portions towards its middle, the bowed side faces 25 reduce the transverse thickness of the leg, and thus the leg has substantially the same ability to flex along its length. Further, the configuration of the gaps 30 between the legs and the adjacent surfaces 25, 26, 27 of two adjoining legs have the effect that there is no interference between the legs which might reduce the ability of the legs to twist.

I claim:

1. A plug for use in securing a screw in a previously formed hole in a workpiece comprising
   a head portion having an enlarged flange adapted to engage the workpiece and a cylindrical portion
   a cylindrical tail portion of substantially the same external diameter as the cylindrical portion of the head portion
   four legs interconnecting the tail portion and the head portion
   a substantially uniform bore extending through the head portion and the four legs to the tail portion
   characterized in that
   the tail portion being provided with screw engaging projections having a central bore of lesser diameter than the substantially uniform bore
   the four legs being identical with each other in shape and each comprising
   a first flexing portion of reduced thickness adjacent the cylindrical portion of the head portion
   a second flexing portion of reduced thickness adjacent the cylindrical tail portion
   a third flexing portion of reduced thickness approximately mid way between the first and the second flexing portions
   the thickness of the leg increasing radially of the plug and decreasing transversely of the radial direction between the first flexing portion and the third flexing portion and between the second flexing portion and the third flexing portion, the overall outer diameter of a central portion of the four legs being slightly greater than the outer diameter of the cylindrical portion of the head portion.

2. A plug according to claim 1 wherein the screw engaging projections of the tail portion are in the form of thread shaped lands.

3. A plug according to claim 1 wherein each leg viewed in a direction radial of the plug generally perpendicular to the leg, comprises bowed side faces so that a central portion of the leg is thinner than end portions thereof.

4. A plug according to claim 3 wherein each leg, viewed in said direction, comprises parallel side faces extending from the head portion to the bowed side faces, and parallel side faces extending from the bowed side faces to the tail portion.

5. A plug according to claim 3 wherein a small gap extends axially of the plug between inner edges of the legs so that, when the plug is inserted into a hole which is of substantially the same diameter as the cylindrical portion of the head portion, the legs can readily be forced inwardly.

6. A plug according to claim 5 wherein the gap between adjacent legs extends from the second flexing portion, past the first flexing portion and a short way into the head portion.

* * * * *